Oct. 26, 1965  R. V. HANSEN  3,214,215
AIR DEFLECTOR FOR WINDSHIELDS
Filed Oct. 14, 1963  2 Sheets-Sheet 1
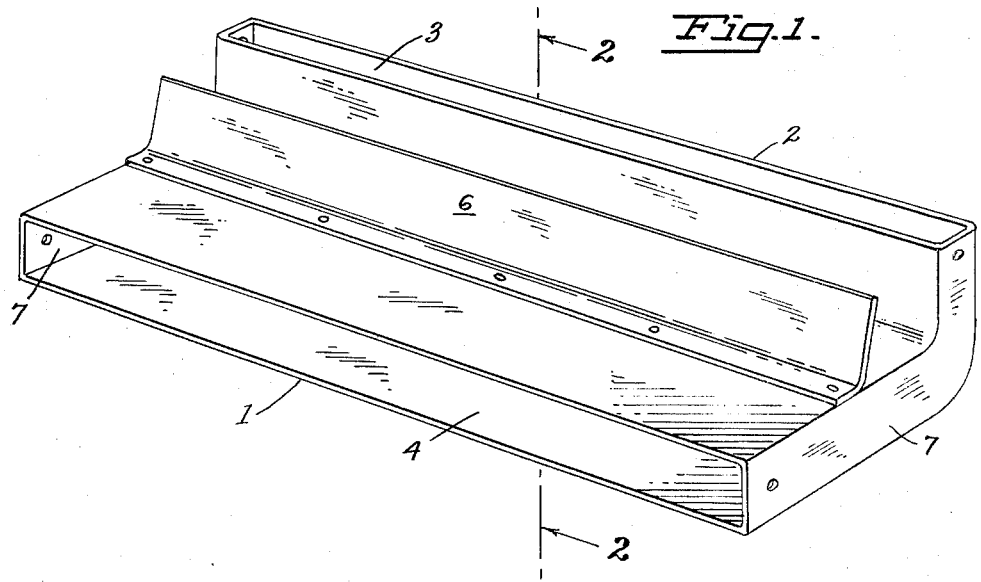
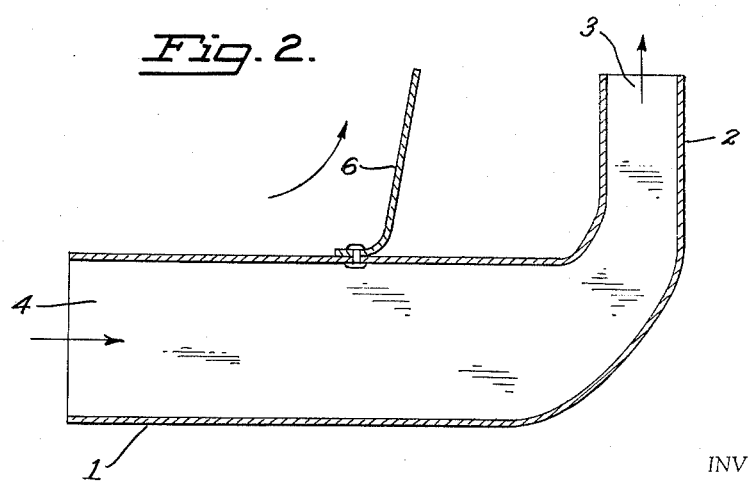
INVENTOR.
REGINALD V. HANSEN
BY George B. White
ATTORNEY Oct. 26, 1965    R. V. HANSEN    3,214,215
AIR DEFLECTOR FOR WINDSHIELDS
Filed Oct. 14, 1963    2 Sheets-Sheet 2

INVENTOR.
REGINALD V. HANSEN
BY
George B. White
ATTORNEY

United States Patent Office 3,214,215
Patented Oct. 26, 1965

3,214,215
AIR DEFLECTOR FOR WINDSHIELDS
Reginald V. Hansen, 1805 Eastman St., Boise, Idaho
Filed Oct. 14, 1963, Ser. No. 316,069
2 Claims. (Cl. 296—91)

This invention relates to an air deflector for windshields with multiple parallel air curtains.

An object of this invention is to provide an air deflector in front of the windshield of a vehicle for directing the approaching airstream upwardly toward and over the top of the vehicle, thereby to prevent impingement of insects, snow or other particles upon the front windshield of an automobile or the like; particularly maintaining the deflected air stream in the form of spaced parallel airstreams so that the air curtain nearer to the approaching air, shields or protects the air curtain nearer to the windshield from breaking down or being blown toward or on to the windshield.

Particularly it is an object of the invention to provide, for the elimination of hazards to safe driving occasioned by the impingement of insects, snow and other particles upon the front windshield of an automobile or the like, a plurality of spaced parallel protective air shields or curtains formed by dividing the approaching airflow and deflecting it directionally in superimposed, spaced, parallel relation, so that the several superimposed but parallel spaced deflected curtains coact to maintain the air shield or curtain nearest to the windshield in an attitude flowing generally upward toward and over the top of the vehicle without being disturbed or without breaking down by gusts of wind or the like.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective view of the multiple air deflector.

FIG. 2 is a cross-sectional view taken substantially on the lines 2—2 of FIG. 1.

Figure 3:
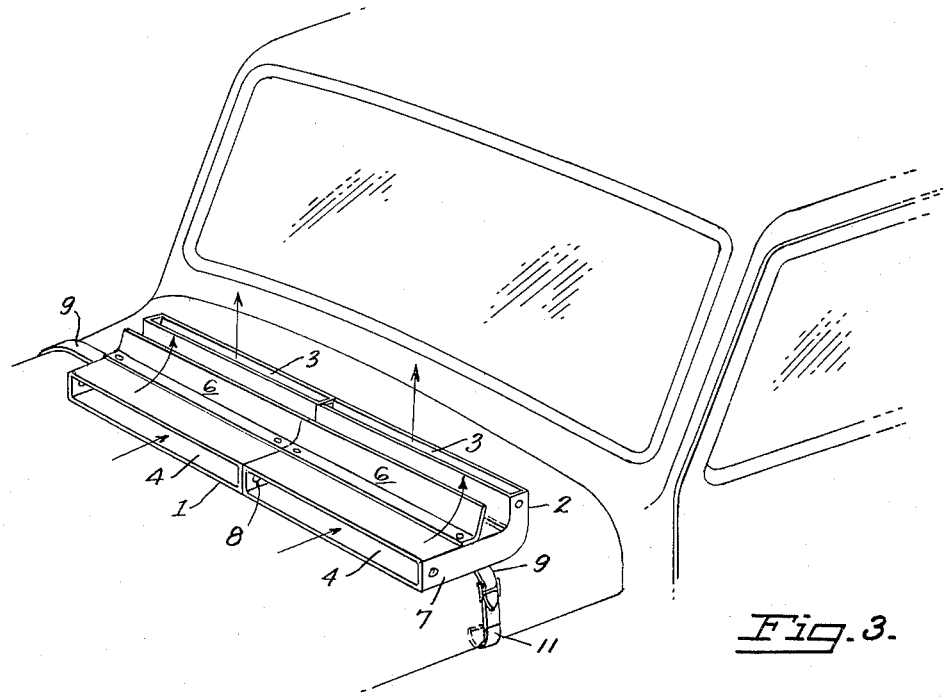
FIG. 3 is a perspective view of the device assembled on the hood of an automobile.

In carrying out my invention, as shown in the illustrative embodiment herein, I make use of a generally hollow substantially flat funnel 1 which extends generally horizontally transversely of the automobile spaced forwardly of the windshield. The hollow flat funnel 1 turns upwardly toward the windshield and then vertically and is contracted so as to form an upright or vertical discharge portion 2, with a horizontal upwardly directed outlet or discharge slot 3. The intake slot or opening 4 of the funnel 1 is generally vertical and is wider and of a larger area than that of the discharge slot 3. The vertical funnel portion 2 narrows gradually to the outlet slot 3 thereby to accelerate the airstream upwardly.

A deflector baffle 6 extends upwardly from the top of the flat funnel 1 and is spaced forwardly from the discharge funnel portion 2 and from the outlet slot 3 so as to deflect airflow on the top of the flat funnel 1 upwardly generally parallel with and spaced from the stream of air issuing from the dicharge slot 3.

In effect the approaching airstream is divided into one stream flowing through the funnel and discharged from the discharge slot 3 and another stream directed along the top of the flat funnel 1 and then deflected upwardly by the deflector baffle 6 spaced forwardly from the airstream issuing from the discharge slot 3. Thus the force of the airstream toward the windshield of the automobile will first be exerted on the protecting shield or curtain created by the deflector baffle 6 and while it may bend or slightly disturb this protective air shield, it will be weakened thereby so as to have no effect on the inner air curtain issuing from the discharge slot 3.

The entire device may be made full length to extend in front of the entire width of the windshield. In the herein illustration the device is made in two sections, one section in front of the driver and the other section in front of the remaining portion of the windshield. In this manner the device may be used in front of the driver only or across any other selected portion of, or along the entire width of the windshield.

For assembly purposes suitable means may be provided to connect the funnel sections end to end. For instance in the present illustration the end walls 7 of the funnel sections are flat so that adjacent end walls 7 of adjacent sections can be assembled in abutting relation. In such assembly the adjacent end walls 7 may be clamped together by suitable bolts 8.

The device may be held in position in any manner suitable for the particular vehicle. For instance in connection with an automobile having a hood, a strap 9 extends from each end of the horizontal flat funnel 1 over the respective edges of the hood, which straps 9 are clamped to said respective edges of the hood by a suitable adjustable strap clamp 11.

Figure 4:
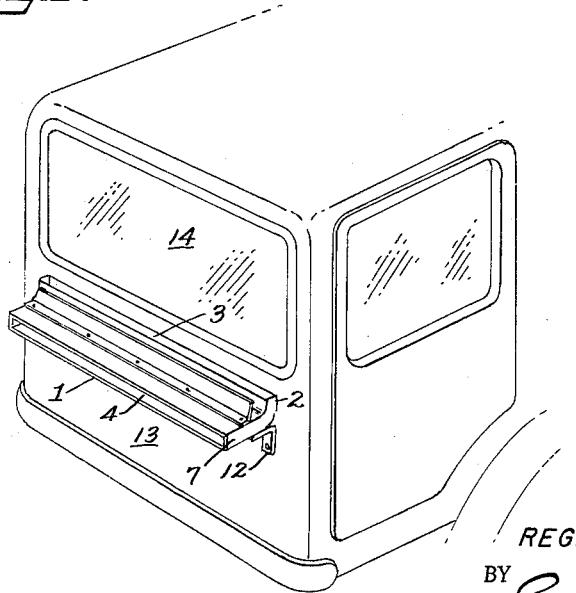
FIG. 4 is a perspective view of the device assembled on the front wall of a bus or truck.

In FIG. 4 is shown an illustrative embodiment of the mounting of the device on busses or trucks or vehicles which have no forwardly projecting hood. In this form a pair of brackets 12 are mounted on the front wall 13 of the vehicle below the windshield 14. If the windshield 14 is set back into the front wall, as in the customary structure, then the funnel 1 is mounted on the brackets 12 by suitable bolts or the like so as to be held in position on the front wall and therefore be spaced forwardly from the windshield 14. If the spacing is not sufficient then the brackets 12 can be made longer so as to project further from the front wall 13 of the vehicle and hold the deflector device in suitably spaced position.

While there are only two parallel air shields produced in the illustrative embdiments in this application, it must be understood that under certain extreme circumstances on some type of vehicles the approaching airstream may be divided by several outlets and deflectors into several parallel spaced air curtains so as to stabilize the protective air curtain nearest to the windshield.

In the herein embodiment of the invention, the device operates most efficiently when the strength of airflow from the funnel discharge slot 3 is more intense than the air curtain formed by the front baffle.

I claim:
1. An attachment on the front of a vehicle for providing vertical airflow in front of the windshield of the vehicle, comprising
   (a) a flat hollow funnel body having parallel bottom and top walls and end walls forming a horizontal flat passage with a horizontal intake slot,
   (b) upwardly curved converging walls in extension of said bottom and top walls respectively forming a curved upwardly tapering passage terminating in an upwardly extended discharge passage with parallel front and back walls, said discharge passage being of lesser cross-sectional area than the area of said intake slot thereby to accelerate and discharge a curtain of air in front of the windshield, (c) a fixed deflector baffle extended upwardly from the top wall of said flat body and along the entire length of said front wall and being substantially parallel with and spaced forwardly of the front wall of said upward discharge passage for deflecting air flow upwardly to form a protective airshield spaced forwardly of said air curtain, (d) and means to mount said flat body on said vehicle spaced forwardly from the front of the windshield.

2. The attachment defined in claim 1, and (e) said hollow body being made of a plurality of sections secured together end to end.

References Cited by the Examiner

UNITED STATES PATENTS

| | | | |
|---|---|---|---|
| 2,816,796 | 12/57 | Saucerman | 296—91 |
| 2,963,315 | 12/60 | Wilsdorf | 296—91 |

FOREIGN PATENTS 749,596  5/33  France.

MILTON BUCHLER, *Primary Examiner.*

A. HARRY LEVY, *Examiner.*